United States Patent [19]

Rockwell, III

[11] Patent Number: 4,707,747
[45] Date of Patent: Nov. 17, 1987

[54] HAND HELD SCANNING INPUT DEVICE AND SYSTEM

[76] Inventor: Marshall A. Rockwell, III, 303 Grenola St., Pacific Palisades, Calif. 90272

[21] Appl. No.: 630,884

[22] Filed: Jul. 13, 1984

[51] Int. Cl.$^4$ .............................................. H04N 1/024
[52] U.S. Cl. .................................... 358/294; 358/285; 358/293; 382/59
[58] Field of Search ............... 358/256, 293, 294, 213, 358/212, 285; 382/59; 250/573

[56] References Cited

U.S. PATENT DOCUMENTS

| | | | |
|---|---|---|---|
| 3,318,996 | 5/1967 | Garfield et al. | 358/294 |
| 3,739,095 | 6/1973 | Alden | 358/294 |
| 4,056,804 | 11/1977 | Whitfield et al. | 382/59 |
| 4,147,928 | 4/1979 | Crean et al. | 235/454 |
| 4,249,217 | 2/1981 | Korte et al. | 358/294 |
| 4,317,137 | 2/1982 | Tompkins | 358/286 |
| 4,408,230 | 10/1983 | Tamura et al. | 358/294 |
| 4,523,235 | 6/1985 | Rajchman | 358/294 |
| 4,574,317 | 3/1986 | Scheible | 382/59 |

FOREIGN PATENT DOCUMENTS

| | | |
|---|---|---|
| 3220016 | 12/1983 | Fed. Rep. of Germany . |
| 5127675 | 10/1980 | Japan ................ 382/59 |
| 56-40359 | 4/1981 | Japan . |
| 56-40357 | 4/1981 | Japan . |
| 57-37973 | 3/1982 | Japan ................ 382/59 |
| 58-168379 | 10/1983 | Japan ................ 358/293 |

OTHER PUBLICATIONS

D. W. Baxter "Scanner Using Linear Array of LED" IBM Technical Discl. Bulletin, vol. 15, No. 1, 6-72.

Primary Examiner—Edward L. Coles, Sr.
Attorney, Agent, or Firm—Flehr, Hohbach, Test Albritton & Herbert

[57] ABSTRACT

A hand held scanning device (20) has a sensing unit (26) consisting of a first linear array (30) of light emitting diodes (LEDs) (32) spaced from and parallel to a second linear array (34) of photosensitive element integrated circuits (36). The LEDs (32) and integrated circuits (36) are mounted on a common substrate (60) facing opening (29) in bottom surface (24) of housing (22). A roller (28) is parallel to the sensing unit (26). A wheel (82) containing light and dark areas is positioned to be rotated by the roller (28). The roller (28) assures that the scanning device (20) travels in a straight line path when it is moved along a sheet of paper. The light and dark areas of the wheel (82) are sensed to define line scans of the device (20) and uniform light exposure by the LEDs (32) on the basis of distance travelled along the sheet of paper. A light collimating fiber optic plate (67) is positioned over each integrated circuit (36).

31 Claims, 10 Drawing Figures

HAND HELD SCANNING INPUT DEVICE AND SYSTEM

BACKGROUND OF THE INVENTION

1. Field of the Invention

This application relates to an improved form of a hand held printed matter scanning device. More particularly, it relates to such a hand held scanning device and electronic system incorporating the hand held scanning device which is simple enough in construction and low enough in cost to be usable as an input device with personal computers, terminals and similar systems. Most especially, it relates to such a scanning device and system which is capable of scanning an entire line of printed matter simultaneously.

2. Description of the Prior Art

A variety of scanning devices for sensing textual matter and graphics in printed form and converting the sensed information to a set of electrical signals for use in systems are known in the art. For example, one type of prior art device uses the equivalent of a television camera to take a picture of a piece of paper or other substrate containing the information. This approach requires the use of relatively expensive lens systems. Further, even with a miniaturized television camera, a relatively large body is required to house the required system. As a result, such systems are typically of the size of a conventional photocopying machine.

An alternative approach known in the art is to use a line scanner formed in a body of semiconductor material. Such a solid state sensing device reads one line across a page of paper at a time. By moving the paper across this scanning line, it is possible to construct a complete picture of the paper. As currently implemented, there are some problems with this approach. Such devices that are presently commercially available require that the paper be moved across the scanner. Accomplishing this paper movement requires a relatively complicated paper moving mechanism. Furthermore, commercially available semiconductor line scanners have a length of only one inch. As a result, to scan a full page width of 8.5 inches, it is necessary to use lenses or fiber optics to image the wider page at the narrower semiconductor scanner. Both of these approaches introduce extra cost into the scanner. This results in a device that is smaller and somewhat less expensive than the camera model, but still too expensive for widespread use with lower cost data processing systems, such as personal computers, terminals and similar systems.

Examples of scanning devices of the above two general types are disclosed in the following issued U.S. Pat. Nos. 3,541,248, issued Nov. 17, 1970 to Young; 4,314,159, issued Feb. 2, 1982 to Davis; 4,317,137, issued Feb. 23, 1982 to Tompkins; 4,365,274, issued Dec. 21, 1982 to Takenouchi et. al; 4,402,017, issued Aug. 30, 1983 to Takei and 4,432,022, issued Feb. 14, 1984 to Tokumitsu.

Other examples of such scanning devices are disclosed by Tandon, "Hand Operated Scanner", *Xerox Disclosure Journal*, Vol. 9, No. 2, March/April 1984, pp. 163-164 and Wallace et. al, "Original Document Size Sensor", *Xerox Disclosure Journal*, Vol. 9, No. 2, March/April 1984, pp. 159-160. One example of such a scanning device is used in the commercially available Dest Turbofont Model 203 optical character recognition document scanners. The state of the art in such scanning devices is summarized in Luther, "Image Processing Update", *Recognition Technologies Today*, June 1983, pp. 13-15, 36 and Brody, "Machines that Read Move Up a Grade", *High Technology*, February 1983, pp. 35-40.

While the art pertaining to such image scanning devices and systems is therefore a well developed one, no such device is presently commercially available which is small enough to be truly portable or low cost enough to be widely used at personal computers, individual terminal workstations, and such low cost systems. The commercially available Dest document scanner is presently the lowest in price of such systems, it is comparable in price to a well equipped IBM personal computer, and it is limited to optical character recognition, with no graphics capability. It therefore is too expensive to become a universally used document scanning input device in low cost systems and is limited to text applications.

SUMMARY OF THE INVENTION

Accordingly, it is an object of this invention to provide a hand held image scanning device and system capable of digitizing text and graphics in printed form suitable for use with personal computers, terminals and similar data processing systems.

It is another object of the invention to provide a hand held image scanning device incorporating an improved technique for moving the scanning device in a straight line path across a sheet of text or graphics and an improved system incorporating the scanning device.

It is a further object of the invention to provide such a scanning device and system in which linear photosensitive elements are arranged so that a plurality of such elements, each narrower than a full page width, are arranged to scan the full page width in a single line scan without requiring the use of a lens system.

It is another object of the invention to provide an improved form of movement detection system for use in a hand held scanning device which will correct for irregularities in the movement of the scanning device during scanning.

It is still another object of the invention to provide an improved form of lensless light sensitive linear array of photosensitive elements.

It is yet another object of the invention to provide an improved package for a hand held scanning device and electronic system capable of providing digitized text and graphics as inputs to personal computers, workstation terminals and similar data processing systems.

The attainment of these and related objects may be achieved through use of the novel hand held scanning input device and system herein disclosed. A hand held scanning input device in accordance with this invention is capable of scanning text and graphics, and the system is capable of providing such text and graphics in digitized form as an input to a personal computer, workstation terminal or other data processing system. The device includes a housing with a line opening and a linear array of photosensitive elements behind and in proximity to the opening. At least one roller is mounted on the housing and has a substantial length in relation to the opening. The roller is positioned to maintain a direction of motion of the housing along a sheet having information to be scanned by the device.

The use of such a roller allows such a linear scanner to provide electrical signals that represent the information in a reliable manner with a very simple structure.

As a result, the scanning device and system of this invention can be provided at a low enough cost to allow its widespread use with personal computers and workstation terminals. With suitable on board memory, the scanner can be used to store images for later regeneration, giving a portable document photocopying capability. It can also be used as part of a low cost facsimile transmitting device.

The attainment of the foregoing and related objects, features and advantages of the invention should be more readily apparent to those skilled in the art, after review of the following more detailed description of the invention, taken together with the drawings, in which:

DETAILED DESCRIPTION OF THE INVENTION

Turning now to the drawings, more particularly to FIGS. 1-5, there is shown a hand held scanning input device 20 in accordance with the invention. The scanning device 20 has a housing 22 having a bottom surface 24. Mounted on the bottom surface 24 are a sensing unit 26 extending lengthwise along the housing 22 behind window 27 and a roller 28 extending through opening 29 parallel to the sensing unit 26. The roller 28 should be easily removable from the housing 22 to allow cleaning of residue that may build up in use of the scanning device 20. Roller 28 is fabricated of rubber or other suitable high friction material to prevent slippage on a surface being scanned with the device 20. A ridge 29 extends parallel to the roller 28 on the bottom surface of the housing 22 on the opposite side of window 27 from the roller 28. Ridge 29 extends from the bottom 24 to the same extent as the roller 28, so that roller 28 and ridge 29 cooperate to space window 27 off a surface being scanned and parallel to the surface. The sensing unit 26 consists of a linear array 30 of light emitting diodes (LEDs) 32 spaced along the length of the sensing unit 26 and a linear array 34 of photosensitive element chips 36 corresponding in length to the LED array 30. The arrays 30 and 34 are each at least 8.5 inches in length, in order to extend along the entire width of a conventional sheet of paper. There are an ON-OFF switch 38 and a contrast control 40 on the front 42 of the housing 22. A cable 44 and a suitable connector 46 allow the scanning device 20 to be connected to a parallel or serial input/output (I/O) port of a personal computer or terminal for use of the scanning device 20 as an input device to the computer or terminal. If desired, the device 20 could alternatively incorporate an infrared or radio interface to the computer or terminal for wireless operation. Circuits 48 mounted within the housing 22 are provided to convert patterns of light and dark areas sensed by the photosensitive elements to digital signals for supply to the computer or terminal on cable 44.

Figure 3:
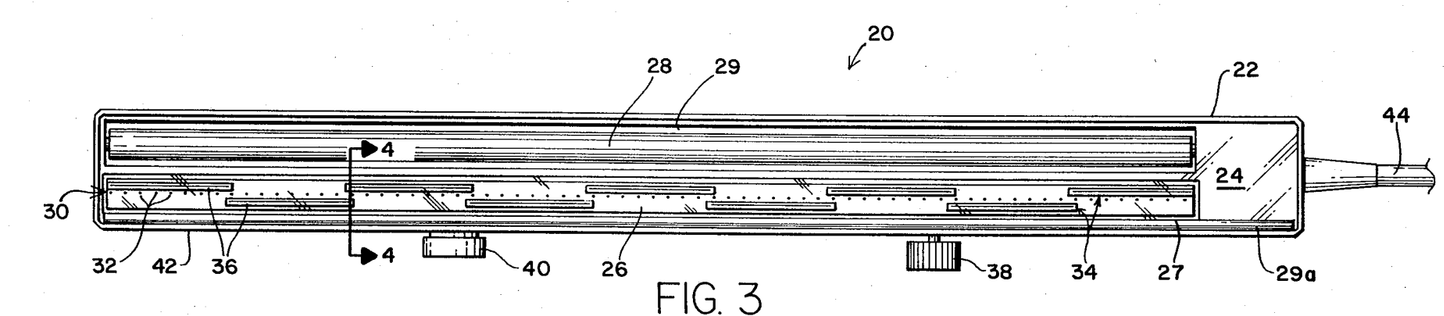
FIG. 3 is a bottom view of the scanning device shown in FIG. 1.

As is best shown in FIG. 3, the array 34 of photosensitive element chips 36 is preferably mounted in staggered fashion on either side of the LED array 30. The chips 36 are arranged in the array 34 so that there is no gap between a last photosensitive element in one of the chips 36 and a first photosensitive element in the next chip 36 on the other side of the LED array 30 extending laterally across the array 34. This arrangement allows commercially available chips 36 with borders on each end of the chip to be used in the array without producing gaps in the array between the chips 36. Differences in the vertical positioning of the area scanned by the chips 36 as a result of their staggered positioning with respect to array 30 can be adjusted with suitable software to produce a non-staggered image. In addition to allowing the use of off-the-shelf chips 36, this arrangement of the chips 36 allows removal and replacement of defective chips 36 more readily, without possible damage to adjacent chips 36. The chips 36 are desirably implemented with commercially available photodiode chips, such as Reticon G series RL128G, RL256G, RL512G or RL1024G photodiode chips, available from EG&G Reticon, Sunnyvale, Calif. 94086, or CCD122 or CCD123 type 1728 element linear image sensor chips, available from Fairchild, Mountain View, Calif. These latter integrated circuit chips are capable of scanning at a data rate of 1 megabit/second.

Figure 1:
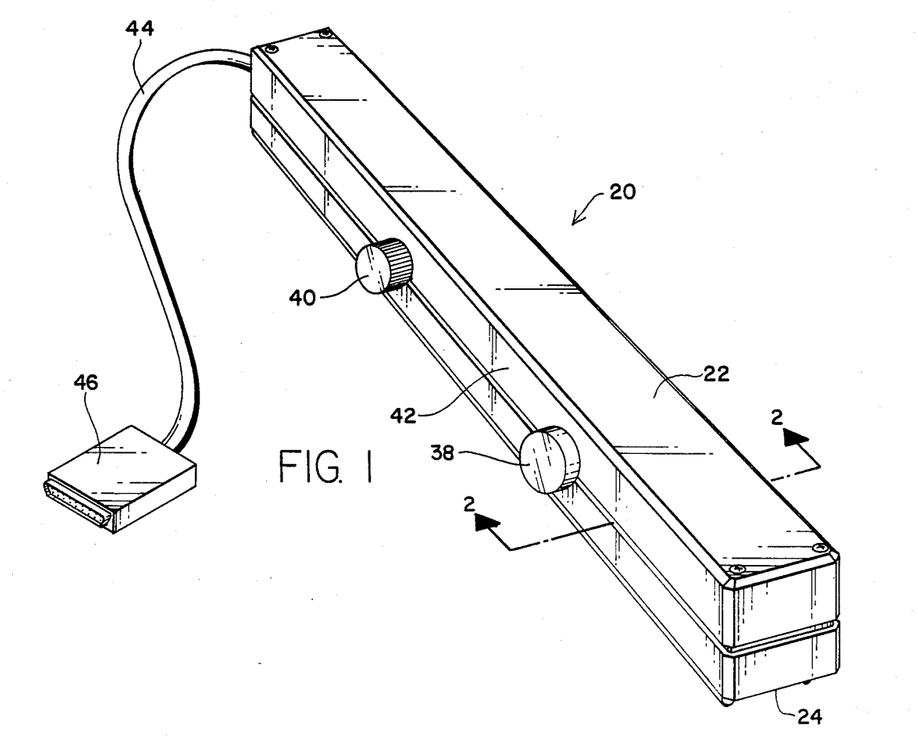
FIG. 1 is a perspective view of a scanning device in accordance with the invention.
Figure 2:
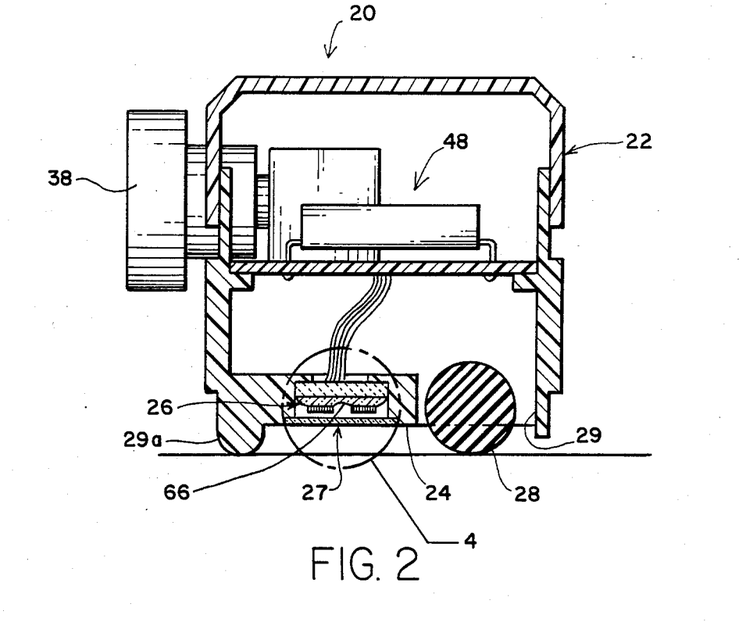
FIG. 2 is a cross-section view taken along the line 2—2 in FIG. 1.

In operation, the scanning device 20 is place at the top of a sheet of paper or other substrate containing text and/or graphics, the ON-OFF switch 38 turned on, the contrast adjusted with knob 40, and the device 20 is moved down the page. The LEDs 32 illuminate each line to be sensed and the photosensitive elements detect the pattern of light and dark areas corresponding to the text or graphics at each scan line.

Figure 4:
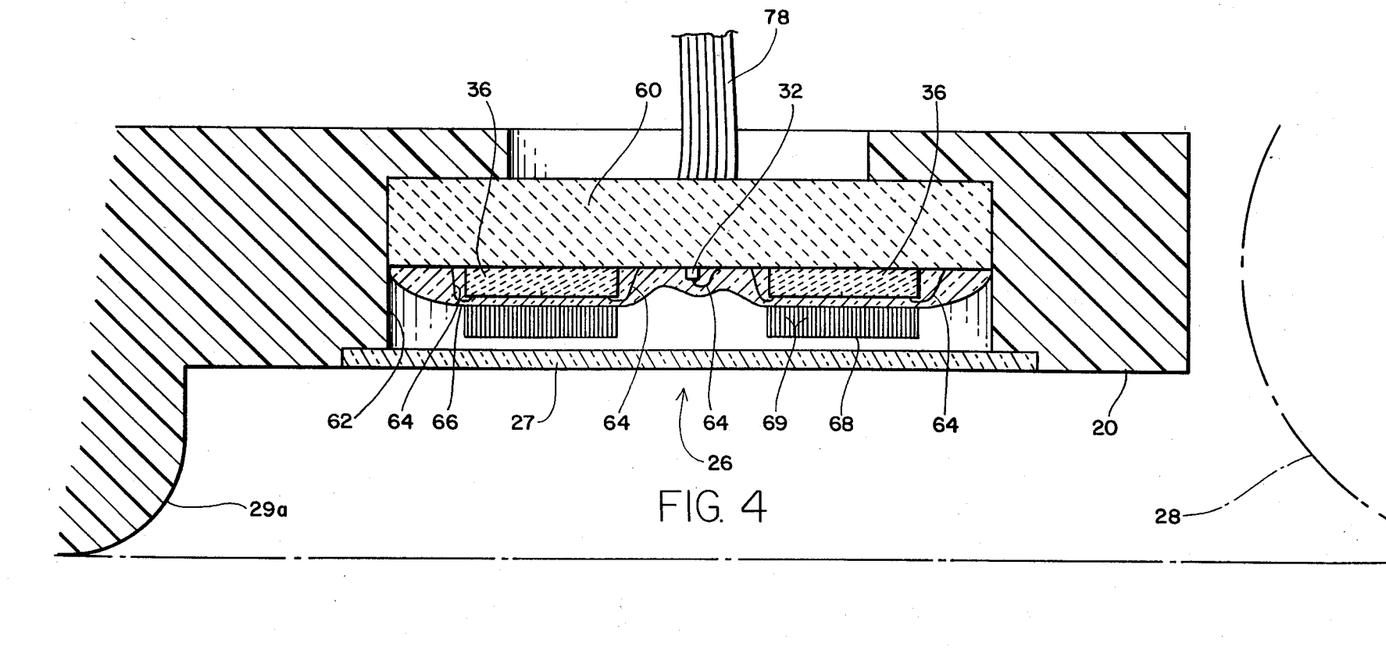
FIG. 4 is a cross section view taken along the line 4—4 in FIG. 3.

FIG. 4 shows further details of the sensing unit 26. The photosensitive element chips 36 and the LEDs 32 are mounted directly on a ceramic substrate 60 in recess 62. Mounting the photosensitive element chips 36 in this manner, rather than utilizing dual-in-line packaged chips, means that a level of packaging can be eliminated in the device. Standard attach wires 64 are used to connect the chips 36 to conductive patterns on the ceramic substrate 60 in a conventional manner. A transparent layer 66 of a plastic or other suitable protective material is deposited over the chips 36 and diodes 32. Collimating fiber optic plates 68 consisting of short optical fibers 69 are positioned over the photosenstive elements of the chips 36. Such fiber optic plates 68 are commercially available from Collimated Holes, Inc., Campbell, Calif. 95008 and serve to narrow the field of vision of each photosensitive element in the chips 36, so that a lens system is not required in the device 20, as is more fully explained below in connection with FIG. 8. A glass or other transparent material protective glass window 27 is positioned over the chips 36 and LEDs 32 on the housing 22.

Figure 5:
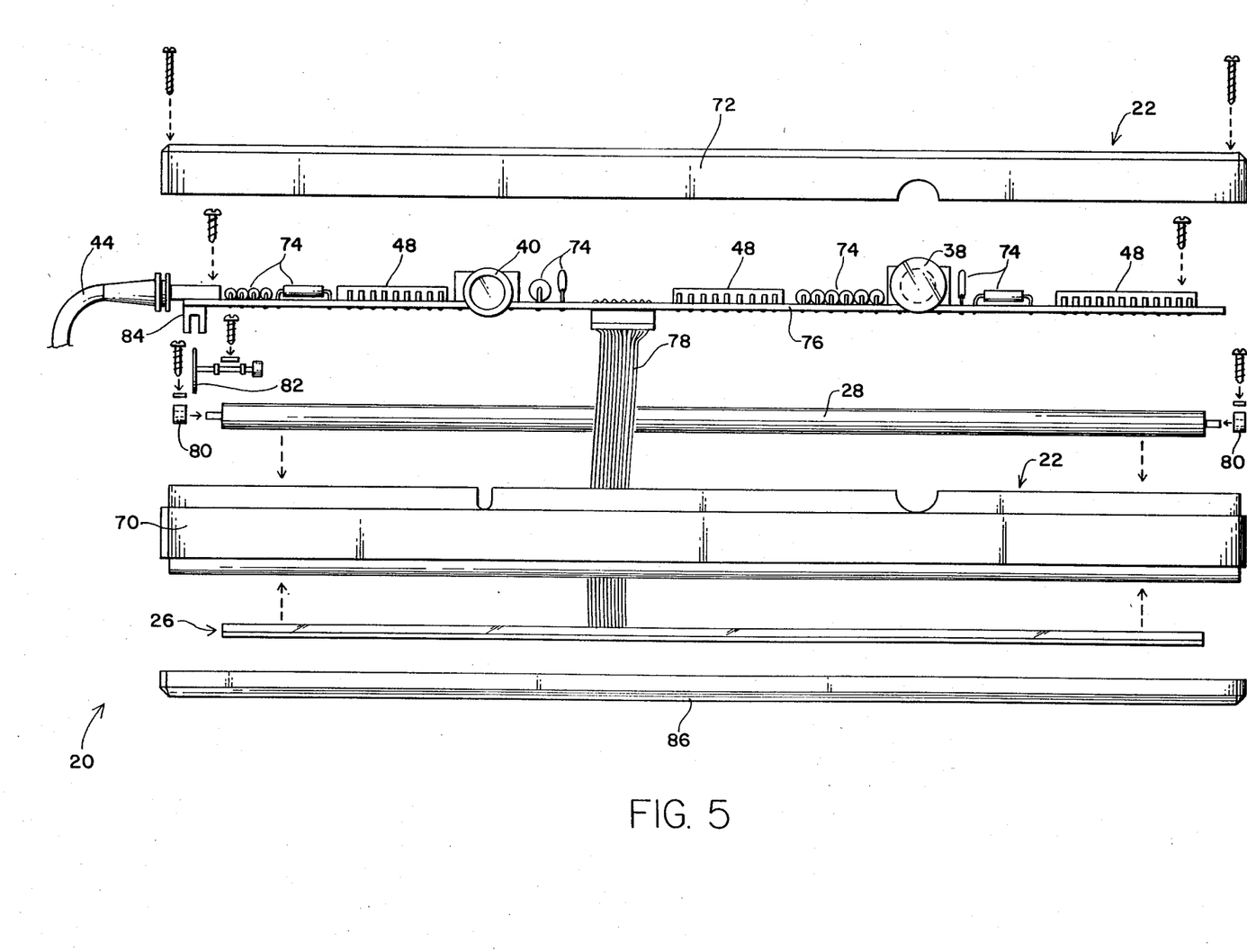
FIG. 5 is an exploded side view of the scanning device shown in FIG. 1.

Interior details of the scanning device 20 shown in FIGS. 1-3 are shown in FIG. 5. The housing 22 consists of a plastic body 70 and a top 72. The circuits 48, ON-OFF switch 38, contrast control 40 and other circuit components 74 are all mounted on a printed circuit board 76. The sensing unit 26 is connected to the printed circuit board 76 by cable 78. Cable 44 is also connected to the circuit board 76. Sensing unit 26, circuit board 76 and roller 28 are mounted inside the body 70. Bronze bearings 80 are provided on the roller 28 to support it for rotation in body 70. A disk 82 having a pattern of light and dark areas is also mounted for rotation, driven by the roller 28, within the body 70. A photo-optical shaft position encoder 84 is provided on the circuit board 76 to sense the light and dark areas on the disk 82. The disk 82 and shaft position encoder 84 are used to determine motion of the roller 28 along a sheet of paper or other substrate containing information to be scanned. The outputs of the shaft position encoder 84 are used to define scanning lines in operation of the scanner. They are also used to time activation of the LEDs 32 to assure even exposure for each scanning line. A removable protective cover 86 snaps on the bottom of the body 70 over the sensing unit 26 and the roller 28 when the scanner 20 is not in use.

Figure 6:
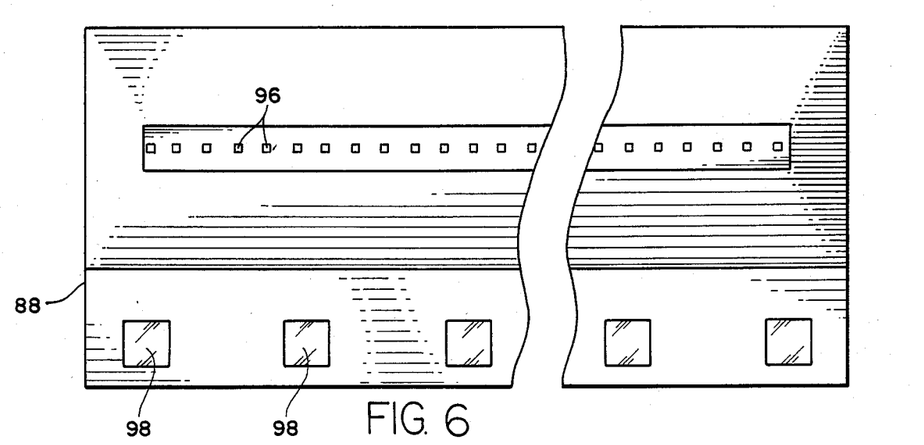
FIG. 6 is an enlarged plan view of a portion of another embodiment of the invention.
Figure 7:
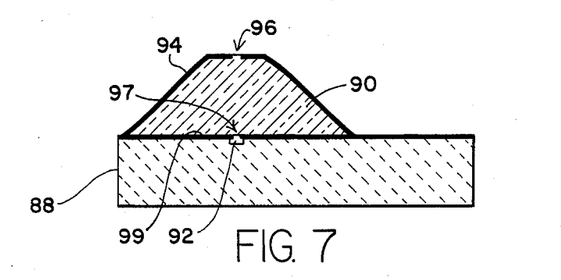
FIG. 7 is a cross-section view taken along the line 7—7 in FIG. 6.

FIGS. 6 and 7 show details of an alternative form of photosensive element chips 80 that can be substituted for the photosensitive element chips 36. The chips 80 are modified for use in the scanner 20 by depositing a layer 90 of plastic or other transparent material on the chips over the photodiodes 92. An opaque covering 94 is provided on the layer 90, such as by vacuum deposition of aluminum. Sensing apertures 96 are formed in the covering 94 by known photolithographic techniques. The apertures 96 and apertures 97 on the surface 99 of the chips 80 serve to collimate light passing through them before it impinges on the photodiodes 92. The layer 90, covering 94 and apertures 96-97 direct light to the photodiodes 92 in a geometry that is especially suited for the scanner 20. The attach wires 64 (FIG. 4) connect to pads 98.

Figure 8:
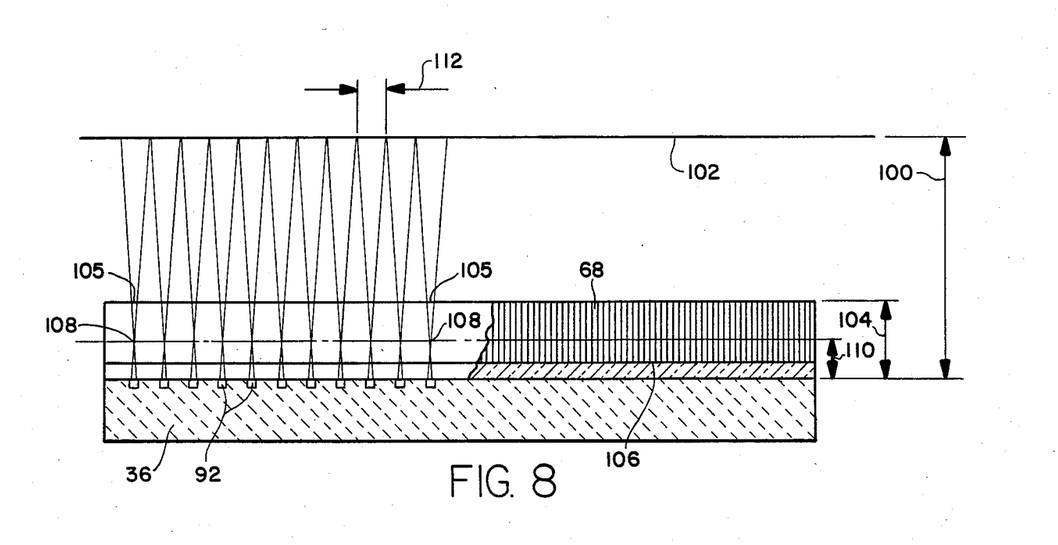
FIG. 8 is a side view of a portion of the system shown in FIG. 1, containing additional information useful for understanding the invention.

FIG. 8 shows details of the geometry defined by the chips 36 and the rest of the scanner 20 that is useful for a further understanding of the construction of the scanner 20. The distance 100 is from the photodiodes 92 within chip 36 and paper 102 being scanned with a scanner 20 incorporating the chip 36. The distance 104 is from each photodiode 92 to its corresponding aperture 105. Edge 106 representing the bottom of the collimating fiber optic plate 68 is positioned over the chip 36 above the photodiodes 92. Points 108 represent the crossover points of each image passing through the aperture defined by each optical fiber. Distance 110 is from each detector 92 to its corresponding crossover point 108. Distance 112 is the width of the detection area of each photodiode 92 on the paper 102.

Assuming square apertures 105 and photodiodes 92 each 20μ meter across and that the distance 100 from photodiodes 92 to paper 102 is 1 mm, the table below shows other distances identified above for chips 36 of various resolution:

| Detector Resolution/Inch | Active Paper Area 112 | Detector to Aperature 104 |
|---|---|---|
| 50 | 500 μM | 76.9 μM |
| 100 | 250 | 148.1 |
| 200 | 125 | 275.9 |
| 300 | 83.3 | 387.2 |

-continued

| Detector Resolution/Inch | Active Paper Area 112 | Detector to Aperature 104 |
|---|---|---|
| 400 | 62.5 | 484.8 |

Figure 9:
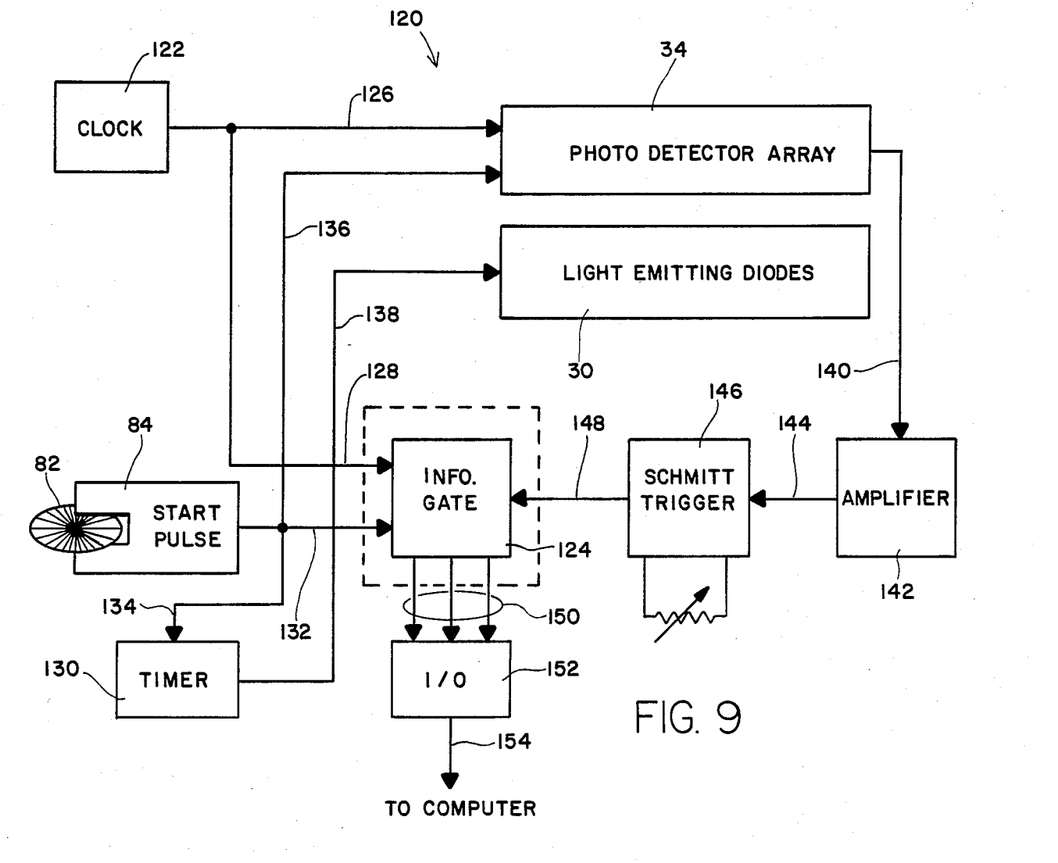
FIG. 9 is a block diagram of an electronic system incorporated in the scanning device shown in FIG. 1.

FIG. 9 shows an electronic system 120 incorporated within the scanner housing 22 for providing input signals from the scanner 20 to a personal computer, terminal or other data processing system to which the scanner 20 is connected. Clock 122 is connected to the photosensitive element array 34 and to data gate 124 by lines 126 and 128, respectively. The shaft position encoder 84 is connected to the data gate 124, timer 130 and LED array 30 by lines 132, 134 and 136, respectively. The timer 130 is connected to the LED array 30 by line 138. Outputs from the photosensitive element array 34 are supplied on line 140 to amplifier 142. The amplified outputs are supplied on line 144 to Schmitt trigger circuit 146. An analog/digital converter could also be provided to receive the outputs, in order to supply signals representing grey tones scanned by the device 20. Shaped output pulses are supplied on line 148 to data gate 124. Data gate 124 supplies its outputs on lines 150 to an I/O interface circuit 152. The data stream is supplied on line 154 to a parallel or serial port of a computer to which the scanner is connected.

In practice, clock 122 supplies 1 MHz square wave pulses to the photosensitive element array 34 and the data gate 124. The start pulse supplied by the shaft position encoder 84 is a square pulse the size of one clock pulse. The start pulse is triggered by rolling the scanner 20 on a sheet of paper. As a result of rotation of the wheel 82 in response to rotation of the roller 28, start pulses are generated at intervals related to the distance the scanner travels on the paper to define scanning lines in operation of the scanner 20. In response to the start pulses, the timer 130 turns on the LEDs 32 in array 30 for a predetermined interval to ensure even exposure during a line scan. In response to the start pulse, the photosensitive element array 34 scans from end to end. Amplifier 142 amplifies the light/dark signal outputs from the array 34. Schmitt trigger 146 turns the amplified analog signal from amplifier 142 into a square wave at an adjustable threshold. Adjusting the threshold gives contrast control for the scanner 20. The data gate 124 measures the time between start pulses. When the time between start pulses is greater than 40 milliseconds, data gate 124 turns the data off for one line scan. This is necessary due to dark current from the array 34.

In operation of the scanner 20, with paper to be scanned spaced 3 mm from the LEDs 32, a spacing of 3.3 mm between each LED 32, and a distance of 1.5 mm between the LEDs 32 and the apertures 105 of adjacent sensor chips 36, an illumination intensity that is constant within 5 percent can be maintained at a line on the paper beneath the apertures 105.

Figure 10:
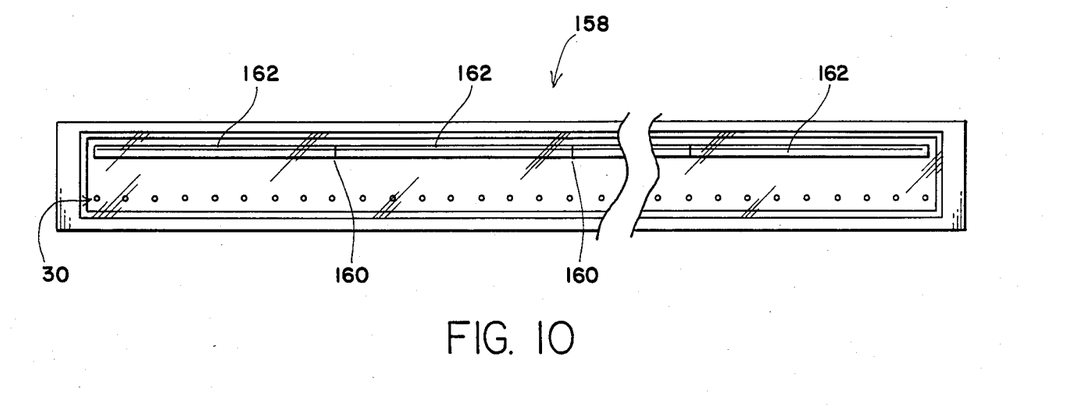
FIG. 10 is a bottom view of another embodiment of a scanning device in accordance with the invention.

FIG. 10 shows an alternative embodiment of a scanner 158 in accordance with the invention, in which sensor chips 162 are arranged in an in-line fashion on one side of the LED array 30. In this arrangement, the ends 160 of adjacent chips 162 are adjacent, so that gaps in the placement of photodiodes near the ends 160 of each chip 162 are eliminated to avoid producing gaps in the scan lines obtained in use of the scanner 158.

Preferably, software for analyzing the digitized images obtained with the scanning device 20 is run on the personal computer or other data processing system to which the scanning device is attached. In this manner, sophisticated analysis of the images may be carried out, such as optical character recognition, while keeping the scanning device 20 simple in construction.

It should now be readily apparent to those skilled in the art that a scanner 20 capable of achieving the stated objects of the invention has been provided. The scanner 20 is capable of digitizing text and graphics in printed form for use in data processing systems. The structure of the scanner insures that it is moved across a sheet of text or graphics in a straight line path. Commercially available sensor chips 36 each less than a page width are arranged in the scanner so that a full page width can be scanned in a single line scan, without requiring the use of a lens system.

It should further be apparent to those skilled in the art that various changes in form and details of the invention as shown and described may be made. For example, a broad spectrum light source could be used in place of the LEDs in array 30, along with sensor chips capable of detecting colors to give the scanner 20 the ability to provide digitized color images, with suitable modifications to the sensing circuitry. A shaft position encoder 84 could be provided at each end of the device in combination with separately mounted rotating wheels in place of the roller 28, along with suitable circuitry provided to compensate for slight deviations from a straight line path along a sheet of paper being scanned. Battery power and a tape casette unit could be incorporated to allow remote operation of the scanning unit, disconnected from a data processing system, with subsequent transfer of information stored on a casette tape to the data processing system. It is intended that such changes be included within the spirit and scope of the claims appended hereto.

What is claimed is:

1. A hand held scanning device for text and graphics, which comprises a housing, a line opening in said housing, a planar substrate in said housing opposite said line opening, a linear array of photosensitive elements behind and in proximity to said opening, a line light source parallel to and spaced from said photosensitive element array, said light source being positioned to direct light through said line opening at a sheet having information to be scanned by said device, both said linear array and said line light source being mounted on said planar substrate in side-by-side relationship, and at least one high friction resilient material rotatable guide member mounted on a surface of said housing and being configured to make contact with a substantial area on a sheet having information to be scanned by said device when compared with an area of the surface of said housing, said at least one guide member being positioned to maintain a direction of motion of said housing along the sheet.

2. The hand held scanning device of claim 1 in which said line light source comprises a linear array of light emitting diodes.

3. The hand held scanning device of claim 1 additionally comprising a movable member containing a pattern of light and dark areas, said movable member being positioned to be moved when said roller is rotated, and a shaft position encoder positioned to sense the pattern of light and dark areas on said movable member.

4. The hand held scanning device of claim 1 additionally comprising means for determining an extent of motion of said at least one guide member, said motion determining means being connected to provide signals for controlling operation of said photosensitive element linear array to define a plurality of line scans as said scanning device is moved along a sheet containing information to be scanned.

5. The hand held scanning device of claim 4 additionally comprising a line light source parallel to and spaced from said photosensitive element array, said light source being positioned to direct light through said line opening at a surface having information to be scanned by said device, said motion determining means being connected to control operation of said light source to provide a uniform amount of illumination for each line scan of said scanning device.

6. The hand held scanning device of claim 4 additionally comprising a data gate connected to receive output signals from said photosensitive element linear array, said data gate also being connected to receive the control signals supplied by said motion determining means.

7. The hand held scanning device of claim 4 in which said motion determining means comprises a movable member containing a pattern of light and dark areas, said movable member being positioned to be moved by rotation of said roller, and a shaft position encoder positioned to detect the pattern of light and dark areas.

8. The hand held scanning device of claim 1 in which said guide member comprises a roller making substantially continuous contact with the sheet along substantially a length of said opening.

9. The hand held scanning device of claim 8 in which said roller is an elastomeric roller.

10. A hand held scanning device for text and graphics, which comprises a housing, a line opening in a surface of said housing, a linear array of photosensitive elements behind and in proximity to said opening, and at least one high friction resilient material rotatable guide member mounted on said housing and being configured to make contact with a substantial area on a sheet having information to be scanned by said drive when compared with an area of the surface of said housing, said at least one guide member being positioned to maintain a direction of motion of said housing along the sheet, said linear array of photosensitive elements being formed from at least one integrated circuit having photosensitive elements, a transparent body of material positioned over the photosensitive elements, an opaque layer over said transparent body of material, and an aperture over each photosensitive element in said opaque layer.

11. The hand held scanning device of claim 10 in which said photosensitive elements are photodiodes.

12. The hand held scanning device of claim 10 additionally comprising a linear array of light emitting diodes parallel to and spaced from the photosensitive elements.

13. The hand held scanning device of claim 12 in which said at least one integrated circuit and said linear array of light emitting diodes are mounted on a common substrate, said substrate being positioned behind said line opening, with a transparent window mounted in said line opening over said at least one integrated circuit and said light emitting diode array.

14. The hand held scanning device of claim 10 in which said guide member comprises a roller making substantially continuous contact with the sheet along substantially a length of said opening.

15. The hand held scanning device of claim 14 in which said roller is an elastomeric roller.

16. A hand held scanning device for text and grapahics, which comprises a housing, a line opening in a surface of said housing, an array of photosensitive elements behind and in proximity to said opening, and at least one high friction resilient material rotatable guide member mounted on said housing and being configured to make contact with a substantial area on a sheet having information to be scanned by said device when compared with an area of the surface of said housing, said at least one guide member being positioned to maintain a direction of motion of said housing along the sheet, said array of photosensitive elements being formed from at least one integrated circuit having photosensitive elements, and a collimating fiber optic plate being positioned on the transparent body of material over the photosensitive elements of said at least one integrated circuit.

17. The hand held scanning device of claim 16 in which said photosensitive elements are photodiodes.

18. The hand held scanning device of claim 16 additionally comprising a linear array of light emitting diodes parallel to and spaced from said photosensitive elements.

19. The hand held scanning device of claim 18 in which said plurality of integrated circuits and said linear array of light emitting diodes are mounted on a common substrate, said substrate being positioned behind said line opening, with a transparent window mounted in said line opening over said plurality of integrated circuits and said light emitting diode array.

20. The hand held scanning device of claim 16 in which said guide member comprises a roller making substantially continuous contact with the sheet along substantially a length of said opening.

21. The hand held scanning device of claim 20 in which said roller is an elastomeric roller.

22. A hand held scanning device, which comprises a housing dimensioned and configured to be held in a person's hand and moved by hand along a statoinary flat surface containing an image to be scanned, an elongated opening extending along a surface of said housing to be positioned over the stationary flat surface, the elongated opening extending normal to the direction the scanner is to be moved over the flat surface, and at least one high friction resilient material rotatable guide member mounted on said housing and being configured to make contact with a substantial area on the flat surface when compared with an area of the surface of said housing, said at least one guide member being configured to maintain a constant orientation of said housing with respect to the flat surface as said housing is moved by hand along the flat surface.

23. The hand held scanning device of claim 22 additionally comprising a photoreceptive means behind and in proximity to said elongated opening.

24. The hand held scanning device of claim 23 additionally comprising a means for determining an extent of motion of said at least one guide member, said motion determining means being connected to provide signals for controlling operation of said photoreceptive means to define a plurality of line scans as said scanning device is moved along the flat surface.

25. The hand held scanning device of claim 24 in which said motion determining means is further connected to control operation of said line light source to provide a uniform amount of illumination for each line scan of said scanning device.

26. The hand held scanning device of claim 23 in which said photoreceptive means is an array of photodiodes.

27. The hand held scanning device of claim 23 additionally comprising a fiber optic structure positioned between the elongated opening and said photoreceptive means and being configured to guide light from the flat surface to said photoreceptive means.

28. The hand held scanning device of claim 23 additionally comprising a light source on said housing parallel to said photoreceptive means.

29. The hand held scanning device of claim 28 in which said light source comprises an array of light emitting diodes.

30. The hand held scanning device of claim 22 in which said guide member comprises a roller making substantially continuous contact with the flat surface along substantially a length of said opening.

31. The hand held scanning device of claim 30 in which said roller is an elastomeric roller.

* * * * *